United States Patent
Johansson et al.

(10) Patent No.: US 8,859,066 B2
(45) Date of Patent: Oct. 14, 2014

(54) COATING COMPOSITION, METHOD OF PREPARATION THEREOF AND SUBSTRATE COATED THEREWITH

(75) Inventors: Solveig Johansson, Stenungsund (SE); Christer Lind, Stora Höga (SE); Cecilia Rydin, Sävedalen (SE)

(73) Assignee: Borealis Technology Oy, Porvoo (FI)

( * ) Notice: Subject to any disclaimer, the term of this patent is extended or adjusted under 35 U.S.C. 154(b) by 1114 days.

(21) Appl. No.: 10/543,319

(22) PCT Filed: Jan. 28, 2004

(86) PCT No.: PCT/SE2004/000105
§ 371 (c)(1), (2), (4) Date: Aug. 18, 2006

(87) PCT Pub. No.: WO2004/067654
PCT Pub. Date: Aug. 12, 2004

(65) Prior Publication Data
US 2007/0003724 A1   Jan. 4, 2007

(30) Foreign Application Priority Data
Jan. 28, 2003 (SE) ........................ 0300195

(51) Int. Cl.
| | | |
|---|---|---|
| B32B 1/08 | (2006.01) | |
| B32B 15/085 | (2006.01) | |
| B32B 27/32 | (2006.01) | |
| C08L 23/08 | (2006.01) | |
| C08F 10/02 | (2006.01) | |
| C09D 123/08 | (2006.01) | |
| C08F 110/02 | (2006.01) | |
| C08F 4/659 | (2006.01) | |
| C08F 210/16 | (2006.01) | |

(52) U.S. Cl.
CPC ............ C08F 10/02 (2013.01); *C08F 110/02* (2013.01); *C08F 4/65912* (2013.01); *C08L 23/0815* (2013.01); *C08F 4/65916* (2013.01); *C08L 2205/02* (2013.01); *C08F 210/16* (2013.01); *C08L 2314/06* (2013.01); C09D 123/0815 (2013.01); *C08L 2308/00* (2013.01); *Y10S 526/943* (2013.01)
USPC ........ 428/36.91; 428/461; 428/523; 525/240; 526/943

(58) Field of Classification Search
USPC .............. 428/36.91, 461, 523; 525/240, 225; 526/160, 943
See application file for complete search history.

(56) References Cited

U.S. PATENT DOCUMENTS 6,218,472 B1 * 4/2001 Debras et al. ................. 525/191
6,329,054 B1   12/2001 Rogestedt et al.

FOREIGN PATENT DOCUMENTS

| EP | 0 022 376 A2 | 1/1981 | |
|---|---|---|---|
| EP | 0 040 992 A1 | 12/1981 | |
| EP | 0 041 796 A2 | 12/1981 | |
| JP | 07-156268 | * 6/1995 | .............. B29C 63/06 |
| WO | 92/12182 | 7/1992 | |
| WO | 95/12622 | 5/1995 | |
| WO | 97/03139 | 1/1997 | |
| WO | 97/28170 | 8/1997 | |
| WO | WO 97/43323 | 11/1997 | |
| WO | WO 97/44371 | 11/1997 | |
| WO | 00/34341 | 6/2000 | |
| WO | WO 00/40620 | * 7/2000 | .............. C08F 10/02 |
| WO | 01/62847 A1 | 8/2001 | |
| WO | 02/086916 A2 | 10/2002 | |

OTHER PUBLICATIONS

STIC Search results Jan. 6, 2009.*
Machine Translation of JP 07-156268 (Jun. 1995).*
Gahleitner et al. "Designing Polymer Properties." *Tailor-Made Polymers. Via Immobilization of Alpha-Olefin Polymerization Catalysts.* 2008. pp. 1-42.
Russian Office Action for corresponding Russian Patent Application No. 2005127071/15(030392), May 16, 2011.

\* cited by examiner

*Primary Examiner* — Erik Kashnikow
(74) *Attorney, Agent, or Firm* — Merchant & Gould P.C.

(57) ABSTRACT

A coating composition, a process for producing it and substrate coated therewith are described. The composition comprises a multimodal ethylene polymer, which contains from 80 to 99.8% by weight of ethylene repeating units and from 0.2 to 20% by weight of $C_3$-$C_{20}$ α-olefin repeating units, and is a blend of at least a first and a second ethylene polymer prepared by polymerization in the presence of a single site catalyst system.
The blend has a density of 0.915-0.955 g/cm³, a melt flow rate, $MFR_2$, of 0.028-1.5 g/10 min., a molecular weight distribution, $M_w/M_n$, of 3-10, and a CTL 5.0 MPa-value according to ISO 6259 of at least 500 hrs.

21 Claims, No Drawings

COATING COMPOSITION, METHOD OF PREPARATION THEREOF AND SUBSTRATE COATED THEREWITH

FIELD OF THE INVENTION

The present invention relates to a coating composition, to a method of preparing the coating composition, and to a substrate coated with said composition.

TECHNICAL BACKGROUND

Solid substrates are often provided with coatings e.g. for protection. As examples of such substrates may be mentioned pipes, tubes, profiles, wires, cables, etc. The coating preferably comprises a polymer composition that is melt coated on the substrate, e.g. by extrusion. Among the desired properties of the polymer coating composition it is particularly preferred that it has good melt coating processability, good environmental stress cracking resistance (ESCR), low shrinking, and high service temperature.

A coating composition comprising a multimodal ethylene polymer is known through WO 97/03139. This multimodal ethylene polymer contains from 80 to 100% by weight of ethylene repeating units and from 0 to 20% by weight of $C_3$-$C_{10}$ α-olefin repeating units, has a density of between 0.915 g/cm$^3$ and 0.955 g/cm$^3$, and is a blend of at least a first ethylene polymer having a first average molecular weight and a first molecular weight distribution and a second ethylene polymer having a second molecular weight, which is higher than said first molecular weight, and a second molecular weight distribution, said blend having a third molecular weight and a third molecular weight distribution. The multimodal ethylene polymer is said to have good processability and low shrinkage as well as superior environmental stress cracking resistance. Preferentially, the coating composition has an environmental stress cracking resistance (ESCR, F20) (ASTM D 1693/A, 10% Igepal) of at least 100 h, more preferentially at least 500 h, yet more preferentially at least 1000 h and most preferentially 2000 h. For the preparation of the multimodal ethylene polymer any kind of ethylene polymerisation catalyst, such as a chromium catalyst, a Ziegler-Natta catalyst or a group 4 transition metallocene catalyst may be used. No examples of metallocene catalysts are given, however, and all the multimodal ethylene polymers in the examples of WO 97/03139 have been prepared with the use of Ziegler-Natta catalysts.

In this connection WO 01/62847 should also be mentioned. This document relates to a process for coating a substrate by extrusion coating on the substrate 90-100% by weight of a bimodal polyethylene composition that has been polymerised in the presence of a single site catalyst (SSC), and up to 10% by weight of high pressure PE-LD. The coating composition has a melt flow rate (MFR$_2$) of 5 g/10 min or more. The specification indicates that the coating has a thickness of about 10-200 μm and that it is applied on thin substrates like paper, cardboard, polymer films, or aluminium foil.

WO 00/34341 discloses a heterogeneous olefin polymerization catalyst comprising a porous particulate support material having impregnated therein a metallocene catalyst the metal atom whereof is bound to an amide group which is not bound to an η-ligand of the metallocene, or the reaction product of said metallocene catalyst and a cocatalyst. No mention is made of coating compositions or the preparation thereof, particularly not steel pipe coating compositions.

Although the coating compositions according to the prior art such as WO 97/03139 are sufficient for many purposes there is always a need for still more improved coating compositions, especially with regard to the critical property of environmental stress cracking resistance (ESCR).

SUMMARY OF THE INVENTION

The present invention aims at fulfilling the above need and is based on the surprising discovery that the ESCR of the multimodal coating polymer is dramatically increased if the multimodal ethylene polymer is prepared in the presence of a single-site catalyst (SSC).

Thus, the present invention provides a coating composition, characterised in that it comprises a multimodal ethylene polymer, which contains from 80 to 99.8% by weight of ethylene repeating units and from 0.2 to 20% by weight of $C_3$-$C_{20}$ α-olefin repeating units, and is a blend of at least a first and a second ethylene polymer that are obtainable by a process comprising at least two steps in which:

said first ethylene polymer is prepared by polymerising ethylene and optional comonomer(s) in the presence of a single site catalyst system; and said second ethylene polymer is prepared by polymerising ethylene and optional comonomer(s) in the presence of a single site catalyst system;

said steps being performed in any order and the ethylene polymer of each step being present in the following step(s), and producing a blend of from 20 to 80% by weight of said first and from 80 to 20% by weight of said second ethylene polymer, said blend having a density of 0.915-0.955 g/cm$^3$, a melt flow rate, MFR$_2$, of 0.028-1.5 g/10 min., a molecular weight distribution, $M_w/M_n$, of 3-10, and a CTL 5.0 MPa-value according to ISO 6252 of at least 500 hrs.

The present invention further provides a process for producing a coating composition, characterised in that a multimodal ethylene polymer, which contains from 80 to 99.8% by weight of ethylene repeating units and from 0.2 to 20% by weight of $C_3$-$C_{20}$ α-olefin repeating units, and is a blend of at least a first and a second ethylene polymer is prepared by a process comprising at least two steps in which:

said first ethylene polymer is prepared by polymerising ethylene and optional comonomer(s) in the presence of a single site catalyst system; and said second ethylene polymer is prepared by polymerising ethylene and optional comonomer(s) in the presence of a single site catalyst system;

said steps being performed in any order and the ethylene polymer of each step being present in the following step(s), and producing a blend of from 20 to 80% by weight of said first and from 80 to 20% by weight of said second ethylene polymer, said blend having a density of 0.915-0.955 g/cm$^3$, a melt flow rate, MFR$_2$, of 0.028-1.5 g/10 min.; a molecular weight distribution, $M_w/M_n$, of 3-10; and a CTL 5.0 MPa-value according to ISO 6252 of at least 500 hrs.

Still further, the present invention provides a substrate coated with the above defined coating composition.

Further characterising features and advantages of the present invention will appear from the description below and the appended claims.

DETAILED DESCRIPTION OF THE INVENTION

As indicated above the present invention relates to the coating of solid substrates, like those mentioned in WO 97/03139 such as pipes, tubes, profiles, wires, cables, etc. The substrate may be made of various materials, like those mentioned in WO 97/03139 such as metal like iron and steel, aluminium, concrete, ceramics, glass, etc. Preferably the invention relates to the coating of pipes, and most preferably to the coating of metal pipes.

When coating metal pipes it is preferred to first provide the pipe with a primer like an epoxy resin, and a layer of a coupling or compatibilizing agent like a carboxy modified polyethylene, preferably maleic anhydride grafted polyethylene polymer (0.20% by weight maleic anhydride), before applying the coating.

Preferably, the steel pipe coating is carried out on a coating line consisting of a preheating unit, a sidearm extruder or crosshead extruder, a vacuum calibration sleeve, a cooling unit, and a cutting unit. If a crosshead extruder is used it is fed with the multimodal ethylene polymer coating composition by a single screw extruder. Suitably, the screw extruder has a screw diameter of 60 mm, an L/D of 35 and a temperature profile of 200-240° C.

The steel pipe to be coated is preferably first provided with a primer layer of an epoxy resin. A suitable thickness of the primer layer is about 80 µm.

Further, on top of the primer layer a layer of a coupling or compatibilizing agent is preferably provided. This layer may preferably consist of the above mentioned maleic acid anhydride grafted polyethylene polymer and the thickness of the layer is suitably about 200 µm.

Thereafter the steel pipe is coated with the multimodal ethylene polymer by preheating the steel pipe and feeding it through the crosshead with a suitable speed such as 1.2 m/min. In the crosshead the melted multimodal ethylene polymer is applied onto the steel pipe to a suitable thickness such as 3.0 mm.

Then the thus coated steel pipe enters the vacuum calibration sleeve, which is cooled by water of 20° C., and thereby calibrates and solidifies the coating on the steel pipe.

As an alternative to coating the steel pipe by feeding it through a side arm extruder, the preheated steel pipe which is optionally coated with a primer, may be rotated and fed past extruders having flat film dies for the optional layer of coupling/compatibilizing agent, and for the multimodal ethylene polymer cover layer.

By a multimodal ethylene polymer is meant an ethylene polymer having a broad molecular weight distribution produced by blending two or more ethylene polymer components with different molecular weights and different comonomer contents, by polymerising ethylene to different molecular weights and different comonomer contents in a process with two or more reactors in series or by dual-site catalysts in a single reactor or a tandem reactor. By contrast, a unimodal ethylene polymer is obtained from only one ethylene polymer component produced in only one step.

By molecular weight distribution (MWD) is meant the ratio of the weight average molecular weight ($M_w$) and the number average molecular weight ($M_n$), i.e. $M_w/M_n$.

By molecular weight is meant the weight average molecular weight ($M_w$), unless otherwise indicated.

The "melt flow rate" (MFR) of the polymer is determined in accordance with ISO 1133 and is indicated in g/10 min. The MFR is an indication of the flowability, and hence the processability, of the polymer. The higher the MFR, the lower the viscosity of the polymer. The MFR is determined at 190° C. and at different loadings such as 2.1 kg ($MFR_2$), 5.0 kg ($MFR_5$), or 21 kg ($MFR_{21}$).

The environmental stress crack resistance (ESCR), i.e. the resistance of the polymer to crack formation under the action of mechanical stress and a reagent in the form of a surfactant, may be determined according to different methods. One method is ASTM D 1693 that employs the reagent 10% Igepal CO-630. The results are indicated as the percentage of cracked sample rods after a given time in hours. F20 means e.g. that 20% of the sample rods were cracked after the time indicated. This is the test method used in the above mentioned WO 97/03139.

Another method to determine the ESCR is ISO 6252. According to this test method the resistance of polymer sample rods to crack formation under the action of a constant tensile load (CTL) of 5.0 MPa and a reagent in the form of 10% Igepal CO-730 is determined. The result which is also referred to as the CTL 5.0 MPa-value, is indicated as the time in hours before the sample rods crack. This test method is used for determining ESCR at the present invention.

It should be stressed that ISO 6252 is a much more severe test method than ASTM D 1693 for determining ESCR.

As has been mentioned above the coating composition of the present invention comprises a multimodal ethylene polymer obtained by a multistep polymerisation process. Such multistep processes for the preparation of multimodal and especially bimodal olefin polymers in two or more polymerisation reactors in series are previously known and are exemplified by EP 040 992, EP 041 796, EP 022 376 and WO 92/12182 which are incorporated herein by reference. According to these references each of said polymerisation steps may be performed in liquid phase, slurry phase or gas phase.

At the present invention it is preferred to perform the polymerisation steps as a combination of slurry polymerisation and gas phase polymerisation. Preferably, the first step is a slurry polymerisation and the second step is a gas phase polymerisation.

The slurry polymerisation is preferably performed in a so-called loop reactor. The gas phase polymerisation is performed in a gas phase reactor. The polymerisation steps may optionally be preceded by a prepolymerisation in which up to 20% by weight, preferably 1-10% by weight of the total amount of ethylene polymer is formed.

The molecular weight of the polymer formed during the multistep polymerisation may be controlled by the use of a chain transfer agent, preferably hydrogen. To control the molecular weight a suitable amount of hydrogen may be added to any step of the polymerisation.

In the production of a bimodal ethylene polymer, a first ethylene polymer is produced in a first reactor under certain conditions with respect to monomer composition, hydrogen-gas pressure, temperature, pressure, and so forth. After the polymerisation in the first reactor, the reaction mixture including the polymer produced is fed to a second reactor, where further polymerisation takes place under different conditions. Usually, a first polymer of high melt flow rate (low molecular weight) and with a moderate or small addition of comonomer, or no such addition at all, is produced in the first reactor, whereas a second polymer of low melt flow rate (high molecular weight) and with a greater addition of comonomer is produced in the second reactor. The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture. Since multimodal, and especially bimodal, polymers, preferably ethylene polymers, and the production thereof is well-known, no detailed description is called for here, but reference is made to the above documents.

The comonomer(s) for preparing the multimodal ethylene polymer of the present invention may be selected from α-olefins, and more particularly from $C_3$-$C_{20}$ α-olefins, such as 1-butene, 4-methyl-1-pentene, 1-hexene, 1-octene, 1-decene, and 1-eicosene. Preferably the comonomer is 1-butene or 1-hexene. As mentioned above the multimodal ethylene polymer contains 0.2-20% by weight of comonomer repeating units. Preferably, the comonomer repeating units are divided among the polymer fractions of the polymerisation steps so that the first (low molecular weight) ethylene polymer contains 0-10% by weight of comonomer repeating units, and the second (high molecular weight) ethylene polymer contains 1-25% by weight, preferably 2-15% by weight of comonomer repeating units.

Preferably, the polymerisation conditions in the preferred two-stage method are so chosen that a comparatively low-molecular polymer having a moderate, low or, which is preferred, no content of comonomer is produced in one stage, e.g. the first stage, owing to a high content of chain-transfer agent (hydrogen gas), whereas a high-molecular polymer having a higher content of comonomer is produced in another stage, e.g. the second stage. The order of these stages may, however, equally well be reversed.

As mentioned above, the multimodal ethylene polymer of the present invention has an $MFR_2$ of 0.028-1.5 g/10 min. This is a necessary condition for the multimodal ethylene polymer to be adequately coatable on the substrate. Preferably, the multimodal ethylene polymer has an $MFR_2$ of 0.05-1.0 g/10 min, most preferably 0.1-0.8 g/10 min. In order to obtain a multimodal ethylene polymer with the required MFR it is preferred that the low molecular weight ethylene polymer fraction (preferably the first ethylene polymer) has an $MFR_2$ of 30-1000 g/10 min, more preferably 50-500 g/10 min, most preferably 100-300 g/10 min.

To be suitably processable and coatable the multimodal ethylene polymer of the invention further has an MWD of 3-10.

As indicated above, the density of the multimodal ethylene polymer of the present invention is 0.915-0.955 $g/cm^3$, preferably 0.935-0.955 $g/cm^3$, most preferably 0.940-0.950 $g/cm^3$.

The weight ratio between the first ethylene polymer and the second ethylene polymer is between 20:80 and 80:20, preferably between 30:70 and 70:30, more preferably between 40:60 and 60:40 and most preferably between 40:60 and 51:49.

As mentioned above, a characteristic feature of the present invention is that the multimodal ethylene polymer is prepared by polymerisation using a single-site catalyst (SSC).

More particularly, according to one aspect the SSC used at the present invention is a SSC disclosed in WO 95/12622 and WO 01/62847 and having the general formula:

$$(X_1)(X_2)Hf(Cp\text{-}R_1)(Cp\text{-}R_2)$$

wherein
$X_1$ and $X_2$ are either the same or different and are selected from a group containing halogen, methyl, benzyl or hydrogen;
Hf is hafnium;
Cp is a cyclopentadienyl group; and
$R_1$ and $R_2$ are the same or different and selected from the group of linear and branched hydrocarbyl groups containing 1-10 carbon atoms.

Particularly suitable complexes of the kind described above are bis-(n-butyl cyclopentadienyl)hafnium dihalides. Another group of suitable complexes are the siloxy-substituted bridged bis-indenyl zirconium dihalides, which are disclosed in WO 97/28170.

These catalysts are typically supported on a solid carrier, but they may also be used unsupported. The carrier is typically inorganic, and suitable materials comprise, e.g., silica (preferred), silica-alumina, magnesium oxide, titanium oxide, zirconium oxide and magnesium silicate (cf. also WO 95/12622). The catalysts are normally used together with an aluminumoxane cocatalyst. Suitable cocatalysts are, e.g., methylaluminumoxane (MAO), tetraisobutylaluminumoxane (TIBAO) and hexaisobutylaluminumoxane (HIBAO). The cocatalyst is preferably supported on the carrier, typically together with the catalyst complex, although the cocatalyst may optionally be fed into the reactor separately.

A catalyst based on bis-(n-butyl cyclopentadienyl)-hafnium dihalide complex supported on a silica or a silica-alumina carrier together with a methylaluminumoxane cocatalyst is suitable to be run in a process including a loop reactor and a gas phase reactor. Especially suitable is a catalyst based on bis-(n-butyl cyclopentadienyl)hafnium dichloride. Both the complex and the cocatalyst are supported on the carrier.

According to another aspect the SSC is a catalyst as disclosed in WO 00/34341 and comprising a porous particulate support material having impregnated therein a metallocene catalyst the metal atom whereof is bound to an amide group which is not bound to an η-ligand of the metallocene, or the reaction product of said metallocene catalyst and a cocatalyst.

Suitably, the metallocene-amide is of the formula I

     (I)

where n is 1, 2 or 3; a is 0, 1, 2, 3 or 4; b is 1, 2, 3, 4 or 5; n+a+b is the total coordination number for M; M is a catalytically active transition metal or lanthanide; each L, which may be the same or different, is an η-ligand, optionally linked via a bridging group R* to a second group L or to a metal-coordinating group X; each X is a metal coordinating group; and each R, which may be the same or different is a hydrocarbyl group or two groups R, together with the intervening nitrogen, are an optionally substituted, nitrogen bound heterocyclic group, where R (or a heterocyclic group $NR_2$) may contain heteroatoms such as Si, N, P, B, O, S, etc.

In a preferred embodiment, the metallocene-amide is of formula II

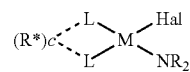

(where each L is a η-ligand, M is a group 3 to 8 transition metal or a lanthanide, Hal is a halide, c is 0 or 1, R*, where present, is a bridging group linking two η-ligands L, and each R, which may be the same or different, is a hydrocarbyl group containing up to 8 carbons or the two R groups together with the intervening nitrogen form a heterocyclic group having up to 9 ring atoms, and R or $NR_2$ may contain other heteroatoms as mentioned above) or the reaction product of a metallocene of formula I and a cocatalyst.

In the metallocene-amide the catalytically active metal is preferably zirconium, hafnium or titanium (i.e. M is Zr, Hf or Ti).

In the SSC the porous support may be any porous, substantially inert support, such as an inorganic oxide or salt or an organic material, e.g. a metal or pseudometal oxide or halide or an organic polymer, for example silica, alumina, zirconia, silica-alumina, magnesium chloride, titanium dioxide, magnesium oxide, aluminium phosphate or an acrylate, methacrylate, polyethylene, polypropylene, polystyrene, or styrene-divinylbenzene polymer. Particularly preferably the support is a fine-grained inorganic oxide such as an inorganic oxide of an element of Group 2, 4, 13 or 14 of the Periodic Table of Elements, most preferably silica, alumina or a mixture or derivative of these.

Where a cocatalyst is used, it may be used separately but more preferably it is also loaded onto the porous support material. In this event it is preferred to allow the catalyst and the cocatalyst to react in a liquid phase and to load the reaction product onto the support. If used separately, the cocatalyst may for example be added into the polymerization reactor together with the supported metallocene-amide. Preferred as cocatalysts are the aluminoxanes, in particular the $C_{1-10}$ alkylaluminoxanes, most particularly methylaluminoxane (MAO).

Such aluminoxanes may be used as the sole cocatalyst or alternatively may be used together with other cocatalysts. Thus besides or in addition to aluminoxanes, other complex forming catalyst activators may be used. In this regard mention may be made of the silver and boron compounds known in the art. What is required of such activators is that they should react with the metallocene-amide to yield an organometallic cation and a non-coordinating anion.

For more information regarding the preferred single-site catalysts used in the present invention reference is made to the above-mentioned WO 01/62847 and WO 00/34341 which are both included herein by reference.

As mentioned earlier, a very important characteristic feature of the present invention is that the multimodal ethylene polymer has an ESCR or CTL 5.0 MPa-value, determined according to ISO 6252 of at least 500 hrs, preferably at least 2000 hrs, more preferably at least 6000 hrs. In view of WO 97/03139 it was very surprising and unexpected that such extremely high ESCR-values could be obtained by using a SSC when polymerising the multimodal ethylene polymer. Thus, WO 97/03139 discloses an ESCR according to ASTM D 1693 A, 10% Igepal of most preferably 2000 hrs. This, value is, however, not directly comparable with the above CTL 5.0 MPa-value of preferably at least 6000 hrs at the present invention, because the CTL 5.0 MPa-value, according to ISO 6252, is determined under much more severe conditions than ASTM D 1693 A. Thus, a bimodal ethylene polymer according to WO 97/03139 prepared by using a Ziegler-Natta catalyst and having an ESCR, determined according to ASTM D 1693 A, of >5000 hrs, i.e. very much higher than what is disclosed in WO 97/03139, only achieved an ESCR of 241 hrs, determined according to ISO 6252, although at CTL 4.6 MPa, i.e at more lenient conditions than CTL 5.0. Thus, a multimodal ethylene polymer according WO 97/03139 which has an ESCR of >5000 hrs, determined according to ASTM D 1693 A, has an ESCR, according to ISO 6252 and determined at a CTL of 5.0 MPa, of less than 241 hrs. This means that by using a SSC for preparing the multimodal ethylene polymer in accordance with the present invention a polymer is obtained that has an ESCR value that is more than 6 times higher than a multimodal ethylene polymer prepared using a Ziegler-Natta catalyst. This is extremely surprising and not to be expected in view of WO 97/03139 in spite of the general statement therein that any kind of polymerisation catalyst inter alia a group 4 transition metallocene catalyst may be used.

To further facilitate the understanding of the present invention an example is given below. This example is only given for illustrative purposes and is not meant to limit the invention in any way.

Example 1

Polymerisations were done in a 5.2 l bench-scale reactor that contained a pre-mixing chamber (PMC reactor). Ethylene, hydrogen and comonomer were mixed and heated in the PMC before introduction to the reactor and were added continuously during polymerisation. Polymerisations were done in isobutane at 80° C. and about 20 bar. A supported single site catalyst based on di-n-butyl-cyclopentadienyl hafnium dichloride activated with MAO was used as a catalyst.

Bimodal polymerisations were done in slurry-slurry phases. It is possible to simulate the slurry-gas phase conditions and perform the polymerisations as slurry-gas phase. As gas-phase polymerisations take several hours, it was decided to do the polymerisations in a time saving way. A unimodal polymerisation was done before the bimodal run in order to find out suitable polymerisation conditions to reach MFR, density and comonomer content of the first step. The same conditions were then used in the first step of the bimodal run.

In the first stage an ethylene homopolymer with a density of 0.970-0.975 g/cm³ was prepared using a supported single site catalyst of the above described metallocene type with an aluminoxane cocatalyst. The $MFR_2$ of the ethylene homopolymer of the first stage was <150 g/10 min and its estimated molecular weight was <29 000 g/mol.

The polymerisation was continued in a second polymerisation stage to prepare an ethylene/1-hexene copolymer. No fresh catalyst was added in the second polymerisation stage. The comonomer content of the copolymer produced in the second stage was 2.4% by weight (0.9 mol %). The amount of polymer produced in the second stage was 50% of the total amount of polymer produced, i.e. the weight ratio between material produced in the different stages was 50:50.

The final bimodal ethylene polymer product, which is a blend of the ethylene homopolymer of the first stage and the ethylene-1-hexene copolymer of the second stage had a density of 0.944 g/cm³, an $MFR_2$ of 0.6 g/10 min, and an $MFR_{21}$ of 22 g/10 min. The molecular weight distribution $(M_w/M_n)$ was 6.2.

The bimodal polymer obtained was used in a coating composition for the coating of a steel pipe as described earlier.

The environmental stress cracking resistance (ESCR) of the bimodal polymer was determined according to the method ISO 6259 under the action of a constant tensile load (CTL) of 5.0 MPa and a reagent in the form of Igepal CO-730 as described above. Very surprisingly, the ESCR according to this severe method was determined to be >12 000 hrs. As a comparison and as mentioned above, a similar coating composition according to WO 97/03139 prepared by using a Ziegler-Natta catalyst achieved a value according to ISO 6259 at a CTL of 4.6 MPa, i.e. at more lenient conditions, of only 241 hrs. This shows the very substantial technical progress achieved by the present invention.

The polyethylene according to WO 97/03139 used for comparison had been prepared by producing a homopolymer in a prepolymerisation reactor at 70° C. The $H_2/C_2$ molar ratio was 0.15 and $C_4/C_2$ 0.04. The material was transported to a loop-reactor and polyethylene with an $MFR_2$ of 400 g/10 min and a density of 965 kg/m³ was produced. The material produced in the loop-reactor was then transported into a gas-phase reactor. The material taken out from the gas-phase reactor had an $MFR_2$=0.4 g/10 min and a density of 942 kg/m³. The ratio between the amounts produced in the pre-polymerisation reactor/loop-reactor/gas-phase reactor was 2:43:55.

Example 2

Polyethylene was prepared in a bench-reactor at 90° C. The polymerisation media was iso-butane. The total pressure was 24.2 bar. No comonomer was added to the reactor. Hydrogen was fed together with ethylene. The concentration of hydrogen was 3700 ppm in the ethylene. The partial pressure of ethylene was 6.5 bar. 1940 g polymer with an $MFR_2$ of 134 g/10 min was produced. The density was 975 kg/m$^3$. This polymer was later used as one component for blending.

One more component to be used for blending was prepared in a bench-reactor. The reactor temperature was 65° C. The polymerisation media was iso-butane. The total pressure was 20 bar. The comonomer content was 2.5% by weight in the iso-butane. No hydrogen was fed to the reactor. The partial pressure was 10.3 bar. The polymerisation time was 60 min. 2510 g polymer with an $MFR_2$ of 0.07 g/10 min and an $M_w$=285000 and a density of 916 kg/m$^3$ was produced. The MWD was 2.6.

The two separately produced polyethylenes were compounded in the compounding equipment FLEXTRAL at 210° C. The $MFR_2$ of the blend was 0.36 g/10 min. The density was 940.3 kg/m$^3$. The CTL 5.0 MPa was >6165 hrs (still running).

The invention claimed is:

1. A coating composition, comprising a multimodal ethylene polymer, containing from 80 to 99.8% by weight of ethylene repeating units and from 0.2 to 20% by weight of $C_3$-$C_{20}$ α-olefin repeating units, and is a blend of at least a first ethylene polymer and a second ethylene polymer resulting from a process comprising at least two steps in which:
    said first ethylene polymer being a low molecular weight fraction and is prepared by polymerising ethylene and optional comonomer(s) in the presence of a single site catalyst system, wherein the first ethylene polymer has a melt flow rate, $MFR_2$, of 100-300 g/10 min; and
    said second ethylene polymer being a high molecular weight fraction and is prepared by polymerising ethylene and optional comonomer(s) in the presence of a single site catalyst system;
    said steps being performed in any order and the ethylene polymer of each step being present in the following step(s), and producing a blend of from 40 to 60% by weight of said first ethylene polymer and from 60 to 40% by weight of said second ethylene polymer, said blend having a density of 0.915-0.955 g/cm$^3$, a melt flow rate, $MFR_2$, of 0.05-1 g/10 min., a molecular weight distribution, $M_w/M_n$, of 3-10, and a CTL 5.0 MPa-value according to ISO 6252 of at least 12000 hrs.

2. A coating composition according to claim 1, wherein the multimodal ethylene polymer contains $C_3$-$C_{20}$ α-olefin repeating units selected from 1-butene, 1-hexene, 4-methyl-1-pentene, 1-octene, 1-decene, and 1-eicosene.

3. A coating composition according to claim 2, wherein said second ethylene polymer has a content of 1.0-25% by weight of $C_3$-$C_{20}$ α-olefin repeating units.

4. A coating composition according to claim 1, wherein the single site catalyst system comprises a complex having the general formula:

$(X_1)(X_2)Hf(Cp-R_1)(Cp-R_2)$ wherein $X_1$ and $X_2$ are either the same or different and are selected from a group containing halogen, methyl, benzyl or hydrogen;

Hf is hafnium;

Cp is a cyclopentadienyl group; and $R_1$ and $R_2$ are the same or different and selected from the group of linear and branched hydrocarbyl groups containing 1-10 carbon atoms.

5. A coating composition according to claim 4, wherein the single site catalyst also comprises an aluminumoxane cocatalyst.

6. A coating composition according to claim 4, wherein the single site catalyst is supported on a solid carrier.

7. A coating composition according to claim 1, wherein the single site catalyst system comprises a porous particulate support material having impregnated therein a metallocene catalyst the metal atom whereof is bound to an amide group which is not bound to an η-ligand of the metallocene, or the reaction product of said metallocene catalyst and a cocatalyst.

8. A coating composition according to claim 7, wherein the metallocene catalyst is of the formula I $(L)_n MX_a(NR_2)_b$ (I)

where n is 1, 2 or 3; a is 0, 1, 2, 3 or 4; b is 1, 2, 3, 4 or 5; n+a+b is the total coordination number for M; M is a catalytically active transition metal or lanthanide; each L, which may be the same or different, is an η-ligand, optionally linked via a bridging group R* to a second group L or to a metal-coordinating group X; each X is a metal coordinating group; and each R, which may be the same or different is a hydrocarbyl group or two groups R, together with the intervening nitrogen, are an optionally substituted, nitrogen bound heterocyclic group.

9. A coating composition according to claim 7, wherein the support material has impregnated therein the reaction product of said metallocene catalyst and an aluminoxane cocatalyst.

10. A coated substrate, coated with a coating composition according to claim 1.

11. A coated substrate according to claim 10, wherein the substrate is a metal pipe.

12. A coated substrate according to claim 11, further comprising a primer layer of an epoxy resin on the metal pipe, a coupling agent on the primer layer, and the coating composition on the coupling agent.

13. A coated substrate according to claim 12, wherein the coupling agent comprises a maleic acid anhydride grafted polyethylene polymer.

14. A process for producing a coating composition, wherein the coating composition comprises a multimodal ethylene polymer, containing from 80 to 99.8% by weight of ethylene repeating units and from 0.2 to 20% by weight of $C_3$-$C_{20}$ α-olefin repeating units, and is a blend of at least a first and a second ethylene polymer prepared by a process comprising at least two steps in which:
    said first ethylene polymer being a low molecular weight fraction and is prepared by polymerising ethylene and optional comonomer(s) in the presence of a single site catalyst system, wherein the first ethylene polymer has a melt flow rate, $MFR_2$, of 100-300 g/10 min; and
    said second ethylene polymer being a high molecular weight fraction and is prepared by polymerising ethyelene and optional comonomer(s) in the presence of a single site catalyst system;
    said steps being performed in any order and the ethylene polymer of each step being present in the following step(s), and producing a blend of from 40 to 60% by weight of said first and from 60 to 40% by weight of said second ethylene polymer, said blend having a density of 0.915-0.955 g/cm$^3$, a melt flow rate, $MFR_2$, of 0.05-1 g/10 min, a molecular weight distribution, $M_w/M_n$, of 3-10, and a CTL 5.0 MPa-value according to ISO 6252 of at least 12000 hrs.

15. A process according to claim 14, wherein at least the second ethylene polymer is prepared in the presence of a comonomer selected from 1-butene, 1-hexene, 4-methyl-1-pentene, 1-octene, 1-decene, and 1-eicosene.

16. A process according to claim 14, wherein the polymerisation is carried out in the presence of a single site catalyst system comprising a complex having the general formula:

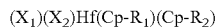

wherein
$X_1$ and $X_2$ are either the same or different and are selected from a group containing halogen, methyl, benzyl or hydrogen;
Hf is hafnium;
Cp is a cyclopentadienyl group; and
$R_1$ and $R_2$ are the same or different and selected from the group of linear and branched hydrocarbyl groups containing 1-10 carbon atoms.

17. A process according to claim 16, wherein the single site catalyst further comprises an aluminumoxane cocatalyst.

18. A process according to claim 16, wherein the single site catalyst is supported on a solid carrier.

19. A process according to claim 14, wherein the polymerisation is carried out in the presence of a single site catalyst system comprising a porous particulate support material having impregnated therein a metallocene catalyst the metal atom whereof is bound to an amide group which is not bound to an η-ligand of the metallocene, or the reaction product of said metallocene catalyst and a cocatalyst.

20. A process according to claim 19, wherein the metallocene catalyst is of the formula I

where n is 1, 2 or 3; a is 0, 1, 2, 3 or 4; b is 1, 2, 3, 4 or 5; n+a+b is the total coordination number for M; M is a catalytically active transition metal or lanthanide; each L, which may be the same or different, is an η-ligand, optionally linked via a bridging group R* to a second group L or to a metal-coordinating group X; each X is a metal coordinating group; and each R, which may be the same or different is a hydrocarbyl group or two groups R, together with the intervening nitrogen, are an optionally substituted, nitrogen bound heterocyclic group.

21. A process according to claim 19, wherein the support material has impregnated therein the reaction product of said metallocene catalyst and an aluminoxane cocatalyst.

* * * * *